United States Patent Office 2,812,373
Patented Nov. 5, 1957

2,812,373

VULCANIZATION OF RUBBER WITH CRYSTALLINE ADDUCTS OF UREA

Richard O. Zerbe, Nitro, W. Va., assignor to Monsanto Chemical Company, St. Louis, Mo., a corporation of Delaware No Drawing. Application August 2, 1951,
Serial No. 240,062

3 Claims. (Cl. 260—794)

This invention relates to the vulcanization of a rubber. More particularly it relates to the vulcanization of a rubber with a new class of activators of vulcanization accelerators and to the vulcanized products resulting therefrom.

In the compounding of the various sulfur-vulcanizable rubbers, improvements have been constantly sought, particularly in respect to the more efficient and economical use of vulcanization accelerators therefor. Although many accelerators per se produce vulcanizates having satisfactory physical properties, it has long been known that by incorporating in a compounded stock an activator such as urea, in addition to a primary organic vulcanization accelerator, greater ease in processing and a better vulcanizate is obtained.

It is an object of this invention to provide a class of activators which are capable of assisting primary organic vulcanization accelerators possessing inherent weaknesses, such as inefficient vulcanizing effect at certain temperatures, limited solubility, and poor dispersibility in rubber stocks. It is also an object of this invention to decrease the time of vulcanization. A further object is to provide a wider choice of curing conditions such that a series of combinations varying in scorch and curing properties may be obtained. Other objects will appear hereinafter.

In accordance with this invention it has been found that the above objects are attained by vulcanizing a sulfur-vulcanizable rubber stock in which has been incorporated in addition to a primary organic vulcanization accelerator an adduct of urea with straight-chain aliphatic compounds.

Adducts of urea with straight-chain aliphatic compounds having at least six carbon atoms are a well defined class of stable crystalline compounds (Zimmerscheid et al. "Crystalline adducts of urea, etc.," Ind. Eng. Chem. 42, pp. 1300–1306). While there is no simple molecular ratio of urea to straight-chain aliphatic compound the law of constant proportions holds for all of these adducts (Claff "Addition compounds of hydrocarbons," Journal Meeting in Organic Chemistry, Mass. Inst. Tech. Feb.–May, 1951). The molecular ratio of urea to carbon atom of the straight-chain aliphatic compound for each adduct is less than one and it has been found that the molar ratio of the urea to the straight-chain aliphatic compounds is approximately a linear function of the chain length of the straight-chain aliphatic compound. According to experimental determinations (Zimmerscheid et al., supra) the molecular ratio of urea to carbon atom of certain pure straight-chain alkane hydrocarbons containing 7 to 32 carbon atoms is approximately 0.8±0.1 in each adduct. Apparently the absence of branching and length of the alkyl chain are the predominant factors in the adduct formation in that in general any straight-chain aliphatic compound regardless of the functional group combines with urea to form a crystalline adduct. In those instances wherein the functional group is at the end of the chain, said group's behavior is analogous to a methyl radical.

The following is illustrative of the new activators and their preparation.

*Example 1*

To a suitable reaction vessel containing 24.2 parts by weight (substantially 0.085 mole) of stearic acid dissolved in 300 parts by weight of chloroform is added with agitation a solution containing 90 parts by weight (substantially 1.5 moles) of urea in 405 parts by weight of methyl alcohol. Upon completion of the urea addition the reaction mix is stirred for a short period of time, the precipitate filtered off, washed with chloroform, and dried at room temperature. The white crystalline product so obtained possesses a melting point of about 134–136° C., a nitrogen content of approximately 34.8% and a molecular weight of about 1058. The molecular ratio of urea to carbon atom of stearic acid based upon the nitrogen content is approximately 0.72.

Theoretically the adduct

$CH_3(CH_2)_{16}CO.OH.13[NH_2CO.NH_2]$ possesses a molecular weight of 1064, a nitrogen content of 34.2%, and a molecular ratio of urea to carbon atom of stearic acid of 0.72.

*Example 2*

To a suitable reaction vessel containing 90 parts by weight (substantially 1.5 moles) of urea dissolved in 405 parts by weight of methyl alcohol is added with agitation a solution containing 21.7 parts by weight (substantially 0.085 mole) of a commercial mixture of alkyl amines known as Armeen 2HT, which consists chiefly of $C_{16}$–$C_{18}$ straight-chain alkyl amines, dissolved in 300 parts by weight of chloroform. Upon completion of the n-alkyl amine addition the reaction mix is agitated for a short period of time and then the precipitate is filtered off and dried at room temperature. The white crystalline product so obtained possesses a melting point of about 134–135° C. and a nitrogen content of approximately 34.15%. The molecular ratio of urea to carbon atom of the n-alkyl amine based upon the nitrogen content is approximately 0.87.

*Example 3*

To a suitable reaction vessel containing 90 parts by weight (substantially 1.5 moles) of urea dissolved in 495 parts by weight of methyl alcohol is added with agitation 19.25 parts by weight (substantially 0.085 mole) of a commercial mixture of paraffins consisting chiefly of $C_{15}$–$C_{17}$ straight-chain paraffins. Upon completion of the paraffin addition the reaction mix is stirred for about 75 minutes and the precipitate filtered off and dried at room temperature. The white crystalline product so obtained possesses a melting point of about 135–136° C. and a nitrogen content of approximately 34.6%. The molecular ratio of urea to carbon atom of the paraffin mixture based upon the nitrogen content is approximately 0.93.

*Example 4*

To a suitable reaction vessel containing 90 parts by weight (substantially 1.5 moles) of urea dissolved in 495 parts by weight of methyl alcohol is added with agitation 17.2 parts by weight (substantially 0.085 mole) of dodecyl mercaptan. Upon completion of the mercaptan addition the reaction mix is agitated for a short period of time and then the precipitate is filtered off and dried. The white crystalline product so obtained possesses a melting point of about 134° C. and a nitrogen content of approximately 34.0%. The molecular ratio of urea to carbon atom of the mercaptan based upon the nirtogen content is approximately 0.90.

The new activators of themselves possess little if any vulcanization accelerating activity, however, when employed in conjunction with such primary organic sulfur-containing vulcanization accelerators as the dithiocarbamates, the thiazole sulfides (which includes the thiazoline sulfides), the thiazole sulfenamides, and other thiazole type accelerators, the accelerating action is unexpectedly increased beyond that which would be expected from the use of urea as the activator.

To illustrate the activating properties of the crystalline adducts of urea with linear aliphatic compounds the following stocks are compounded:

| Stock | A | B | C | D | E | F |
|---|---|---|---|---|---|---|
| | Parts by weight | | | | | |
| Smoked sheets rubber | 100 | 100 | 100 | 100 | 100 | 100 |
| Zinc oxide | 5 | 5 | 5 | 5 | 5 | 5 |
| Stearic acid | 1 | 1 | 1 | 1 | 1 | 1 |
| Sulfur | 3 | 3 | 3 | 3 | 3 | 3 |
| 2,2'-Dithio-bis-benzothiazole | 0.7 | 0.7 | 0.7 | 0.7 | 0.7 | 0.7 |
| Urea | | 0.3 | | | | |
| The product of Example 1 | | | 0.3 | | | |
| The product of Example 2 | | | | 0.3 | | |
| The product of Example 3 | | | | | 0.3 | |
| The product of Example 4 | | | | | | 0.3 |

The above stocks so compounded are vulcanized in the usual manner by heating in a press for different periods of time at 135° C. The physical properties of the respective stocks are set forth below:

TABLE I

| Stock | Cure Time in Mins. | Modulus of Elasticity in lbs./in.² at Elongations of— | | | Tensile at Break in lbs./in.² | Ult. Elong., percent |
|---|---|---|---|---|---|---|
| | | 300% | 500% | 700% | | |
| A | 30 | 150 | 353 | 1,190 | 2,583 | 843 |
| B | 30 | 190 | 505 | 1,765 | 2,730 | 795 |
| C | 30 | 223 | 603 | 2,310 | 3,156 | 790 |
| D | 30 | 270 | 695 | 2,780 | 3,470 | 755 |
| E | 30 | 230 | 636 | 2,533 | 3,510 | 780 |
| F | 30 | 210 | 625 | 2,355 | 3,215 | 770 |
| A | 45 | 203 | 513 | 1,833 | 2,763 | 793 |
| B | 45 | 230 | 600 | 2,340 | 2,995 | 765 |
| C | 45 | 270 | 713 | 2,706 | 3,296 | 743 |
| D | 45 | 263 | 816 | 2,656 | 3,580 | 756 |
| E | 45 | 265 | 800 | 2,780 | 3,580 | 770 |
| F | 45 | 260 | 705 | 2,800 | 3,705 | 770 |
| A | 60 | 210 | 546 | 1,986 | 3,026 | 793 |
| B | 60 | 270 | 766 | 2,630 | 2,630 | 760 |
| C | 60 | 270 | 775 | 2,940 | 3,210 | 735 |
| D | 60 | 276 | 760 | 3,056 | 3,490 | 743 |
| E | 60 | 275 | 765 | 2,870 | 3,370 | 750 |
| F | 60 | 280 | 790 | 2,683 | 3,303 | 763 |

Other crystalline adducts exhibiting activating properties when employed in accordance with this invention are those obtained by suitably reacting urea with such straight-chain aliphatic compounds as n-heptane, n-decane, n-undecane, n-dodecane, n-hexadecane, n-octadecane, the various mixtures of straight-chain alkane hydrocarbons derived from petroleum, n-heptyl mercaptan, n-octadecyle mercaptan, n-octyl chloride, n-hexyl bromide, n-octyl bromide, n-dodecyl bromide, n-octadecyl bromide, 1-heptanol, 1-dodecanol, 1-octadecanol, n-decyl amine, n-hexadecylamine, lauric acid, myristic acid, palmitic acid, stearamide, methyl myristate, n-amyl myristate, methyl palmitate, n-butyl palmitate, methyl stearate, n-hexyl stearate, n-octadecyl acetate, n-decyl caproate, and the like. For most purposes adducts of urea with straight-chain aliphatic compounds containing 8–32 carbons are satisfactory. It is preferred to employ straight-chain alkane hydrocarbons, particularly the various mixtures thereof obtained from petroleum. For practical purposes the upper limit of carbon atoms in the straight-chain aliphatic compound is about 50 carbon atoms.

Smaller amounts of the new activators may be employed than that indicated above. Amounts as small as 0.1% on the rubber of the crystalline adducts of urea exhibit activating properties. Amounts higher than that specifically shown, as for example 2% on the rubber, may be employed depending upon the compounding conditions and the objective of the compounder.

By the term "a rubber" as employed in the specification and appended claims, unless otherwise modified, is meant natural and synthetic rubbers which are capable of vulcanization when heated with sulfur and includes latices and reclaims of such materials whether or not admixed with pigments, fillers, softeners, antioxidants, etc.

What is claimed is:

1. The method of vulcanizing india rubber which comprises heating the rubber, sulfur, and a primary organic sulfur-containing vulcanization accelerator in the presence of a small amount of a crystalline adduct of urea with a straight-chain aliphatic compound containing 8 to 32 carbon atoms and which forms an adduct of urea which is approximately a linear function of its chain length.

2. The method of vulcanizing india rubber which comprises heating the rubber, sulfur, and a primary organic sulfur-containing vulcanization accelerator in the presence of a small amount of a crystalline adduct of urea with a mixture of straight-chain alkane hydrocarbons derived from petroleum containing 8 to 32 carbon atoms.

3. The method of vulcanizing india rubber which comprises heating the rubber, sulfur and a thiazole type vulcanization accelerator in the presence of a small amount of a crystalline adduct of urea with a mixture of straight-chain alkane hydrocarbons derived from petroleum containing 8 to 32 carbon atoms.

References Cited in the file of this patent

UNITED STATES PATENTS

| 1,904,573 | Tuley | Apr. 18, 1933 |
| 2,131,127 | Ter Horst | Sept. 27, 1938 |
| 2,247,495 | Harvey et al. | July 1, 1941 |
| 2,480,814 | Punshon et al. | Aug. 30, 1949 |
| 2,549,372 | Fetterly | Apr. 17, 1951 |

FOREIGN PATENTS

| 747,228 | France | June 13, 1933 |